Figure 1:
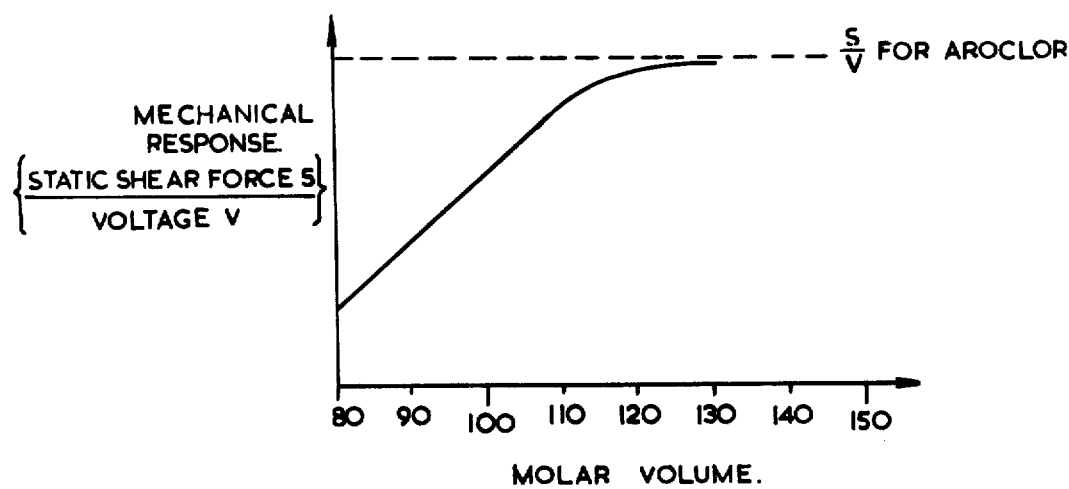

United States Patent [19]

Stangroom

[11] 4,033,892

[45] July 5, 1977

[54] ELECTRIC FIELD RESPONSIVE FLUIDS

[75] Inventor: James Edward Stangroom, Castleton, England

[73] Assignee: The Secretary of State for Defence in Her Britannic Majesty's Government of the United Kingdom of Great Britain and Northern Ireland, Whitehall, London, England

[22] Filed: July 7, 1975

[21] Appl. No.: 593,494

[30] Foreign Application Priority Data

July 9, 1974 United Kingdom ............ 30456/74

[52] U.S. Cl. .................................. 252/76; 252/75; 252/78.1; 252/79
[51] Int. Cl.² ................... C10M 3/34; C10M 3/18; C09K 3/00
[58] Field of Search ................ 252/75, 78, 77, 79, 252/74, 76, 78.1

[56] References Cited

UNITED STATES PATENTS

| 2,417,850 | 3/1947 | Winslow | 106/211 X |
| 3,047,507 | 7/1962 | Winslow | 252/74 X |
| 3,385,793 | 5/1968 | Klass et al. | 252/75 |
| 3,397,147 | 8/1968 | Martwek | 252/78 |
| 3,427,247 | 2/1969 | Peck | 252/75 |

Primary Examiner—Harris A. Pitlick
Attorney, Agent, or Firm—Stevens, Davis, Miller & Mosher

[57] ABSTRACT

A fluid composition which is capable of exhibiting a substantial increase in apparent viscosity under the influence of an electric field and which is of the type wherein solid particles of a chemical substance are dispersed in an electrically non-conducting oleaginous vehicle, the chemical substance being a polyhydric alcohol which contains acid groups and which has an open structure wherein a significant amount of water is adsorbed.

21 Claims, 3 Drawing Figures

ELECTRIC FIELD RESPONSIVE FLUIDS

This invention relates to electric field responsive fluids.

The invention is particularly concerned with fluid compositions which exhibit apparent changes in bulk viscosity under the influence of an applied electric field.

It is known that certain fluids respond to the influence of an electric potential by showing an apparent and pronounced increase in bulk viscosity. In exhibiting this phenomenon, such a fluid is said to behave as a "Bingham plastic". The phenomenon is reversible, and the compositions revert to their initial viscosity when the electric field is removed. Such fluids otherwise known as electroviscous fluids, are commonly used in electroviscous clutches wherein the fluid is disposed between the surfaces of two electrically conductive members and an electric potential is applied across the two members. The electroviscous fluid responds to the application of the electric potential by instantaneously, but reversibly, changing in apparent bulk viscosity. In strong fields, the fluid thickens to a solid or semi-solid condition whereby torque can be transmitted between the surfaces of the clutch members.

Typically, an electroviscous fluid is composed of a solid phase in particulate form which contains a predetermined amount of adsorbed water and which is suspended according to a predetermined volume fraction in a non-conducting base oil. Hitherto, the majority of electroviscous fluids having a high mechanical response have used silica gel as the solid phase but such electroviscous fluids have been found to be abrasive and to exhibit a tendency to settle out over a long period of storage.

According to the invention, a normally fluid composition capable of exhibiting a substantial increase in apparent viscosity under the influence of an electric field comprises a predetermined volume fraction of at least one polyhydric alcohol in solid particulate form which polyhydric alcohol contains acid groups and has an open structure in which a significant amount of water is adsorbed, and an electrically non-conducting oleaginous vehicle. In a preferred embodiment of the invention, said polyhydric alcohol is a polymer of a monosaccharide or a co-polymer of a plurality of monosaccharides.

The said polyhydric alcohol is preferably substantially or totally insoluble both in water and in the oleaginous vehicle, and the oleaginous vehicle is preferably immiscible with water and only weakly absorbed by the said polyhydric alcohol. The amount of water adsorbed by the polyhydric alcohol is a function of the acid strength of the said polyhydric alcohol, generally increasing with a decreasing acid strength.

In the preferred embodiment of the invention wherein the said polyhydric alcohol is a polymer of a monosaccharide, polymers which are suitable include compounds which occur naturally, for example alginic acid, and compounds such as Carboxymethyl (CM) Sephadex (Trade Mark) and Sulphopropyl (SP) Sephadex (Trade Mark) — ion exchangers marketed by Pharmacia Fine Chemicals AB, Uppsala, Sweden — which are manufactured by introducing the appropriate acid group into an initially neutral molecule. Crystalline sucrose and cellulose are examples of polymers of monosaccharides which are not suitable because they have structures which are not sufficiently open to allow water to be adsorbed in the required quantity.

Alginic acid and Sephadex are both polymers of the glucose monomer, alginic acid and CM Sephadex containing carboxyl (—COOH) acid groups, and SP Sephadex containing sulphonic (—SO$_3$H) acid groups. It is not necessary that each monomer should contain an acid group. In alginic acid and CM Sephadex, for example, each glucose monomer normally contains a carboxyl acid group, but in SP Sephadex only one sulphonic acid group is present for every four glucose monomers. By way of further explanation, the glucose monomer may be depicted as:

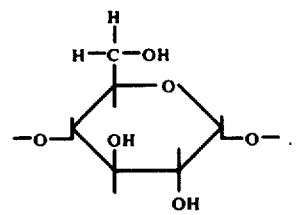

The glucose monomer which carries the carboxyl acid group in alginic acid may be depicted as:

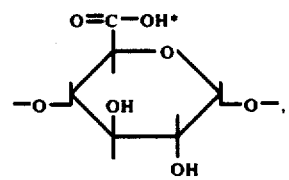

the glucose monomer which carries the carboxyl acid group in CM Sephadex may be depicted as:

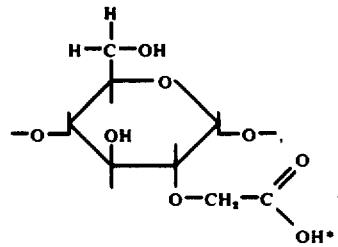

and the glucose monomer which carries the sulphonic acid group in SP Sephadex may be depicted as:

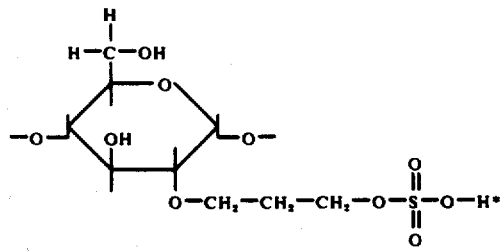

In alginic acid, CM Sephadex and SP Sephadex, the hydrogen atom indicated by the asterisk is easily lost as H$^+$, thus conferring acidic properties.

Other polyhydric alcohols suitable for working the invention include polyvinyl alcohols, sorbitol and mannitol and polymers of a monosaccharide derived from starch, which is a polymer of glucose, or from any other insoluble carbohydrate.

Fluid compositions according to the invention may contain a polyhydric alcohol which is a salt rather than a free acid. As against the free acid, a salt requires a larger amount of adsorbed water but it passes less current at a given voltage and gives a higher mechanical response for a given input of electrical energy. Its mechanical response per unit area is however lower. Fluid compositions of this type are well suited to large scale applications where space is not a limiting factor but control power may be. By way of example, the glucose monomer of the sodium salt of CM Sephadex may be depicted as:

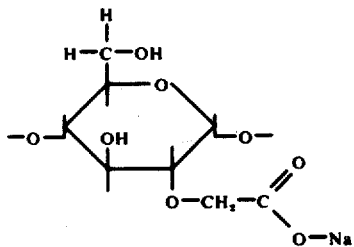

The predetermined volume fraction of the said polyhydric alcohol should be as high as possible consistent with obtaining a fluid composition which is suitable for the required application. A fluid composition having a high volume fraction of polyhydric alcohol will exhibit a greater increase in apparent viscosity under the influence of a transient electric field than a fluid composition having a low volume fraction of polyhydric alcohol but this will be achieved at the expense of a corresponding increase in the viscosity of the fluid in the absence of the electric field. It has been found that, for a fluid composition which is to be pumped through a system at room temperature, a volume fraction of polyhydric alcohol of between 30% and 35% provides a good compromise between the increase in apparent viscosity under the influence of the electric field and the viscosity of the fluid composition in the absence of the electric field, but higher volume fractions may be allowable if, for example, the solid particles of polyhydric alcohol are surface treated or the oleaginous vehicle has a particularly low viscosity. If the particular application does not involve pumping the fluid composition, as in an electroviscous clutch, the volume fraction of polyhydric alcohol may be increased by about 5% over the abovementioned values. The choice of the volume fraction of the polyhydric alcohol will also depend on the temperature at which the fluid composition is required to operate as the viscosity of the fluid composition can increase very rapidly with a decrease in temperature, and vice versa. Thus a fluid composition which is required for low temperature applications may require a reduced volume fraction of polyhydric alcohol whereas one required for high temperature operation may tolerate an increased volume fraction.

Preferably the particles of the said polyhydric alcohol have a diameter which is less than 50 $\mu$m and greater than 1 $\mu$m. In the majority of applications the particle diameter may be expected to lie within the range 4 $\mu$m – 20 $\mu$m but the final choice of particle diameter may be dictated by the nature of the equipment wherein the fluid composition is to be used. Preferably the diameters of the particles are confined to as narrow a range as possible so that fluid compositions which give reproducible results can be obtained.

The choice of the said polyhydric alcohol may also be governed by the temperature at which the said fluid composition is required to operate. It is known that, as the temperature of operation is increased, a fluid composition according to the invention behaves as though it contains an increasing amount of water. Thus it may be preferable that a fluid composition required for a high temperature application comprises a polyhydric alcohol having a high acid strength and thus requiring a correspondingly low amount of adsorbed water.

The performance of a fluid composition according to the invention is most sensitive to the amount of water adsorbed into the said polyhydric alcohol and it is therefore necessary to adjust the amount of adsorbed water to the application for which the fluid composition is required. For a fluid composition comprising a given combination of polyhydric alcohol and oleaginous vehicle, the optimum amount of adsorbed water is not only a function of the required operating temperature but also of the operational shearing rate and speed of response. For example, a fluid composition which is to be used to prevent movement between components which are already stationary with respect to each other — e.g., in securing a workpiece to a lathe faceplate — requires less adsorbed water than a fluid composition which is to be used for arresting movement as in a clutch. Similarly a fluid composition which contains an increasing amount of adsorbed water responds with increasing rapidity to a change in the applied electric potential. Thus, for example, for a fluid composition intended for use in a rapidly acting clutch it has been found desirable to increase the amount of adsorbed water by as much as 2% above the optimum concentration for stationary applications.

It has been found that a general approximation to the optimum amount of adsorbed water $A_w$, expressed as a percentage by weight of the polyhydric alcohol, may be obtained from the equation $$A_w = 4.6 + 0.57 \, pK \qquad \text{Eq (1)}$$

where pK=log 10 acid disassociation constant of the polyhydric alcohol). As a guide to the mixing of a fluid composition according to the invention, it is usual to choose an amount of adsorbed water which is 0.5% greater than the approximate optimum amount as a starting point for the optimization of the fluid composition.

It is preferable that the fluid composition does not contain an amount of adsorbed water which is greater than is necessary for the required application since an excess of adsorbed water not only increases the input electrical power required to produce a given change in the apparent bulk viscosity of the fluid composition but it may also reduce the absolute mechanical response.

By way of emphasis that the figures given for the optimum amount of absorbed water are only approximate, it should be noted that the same polyhydric alcohol may require different amounts of adsorbed water in different oleaginous vehicles.

A measure of the amount of water adsorbed into the polyhydric alcohol may be determined conveniently by measuring the relative humidity of the air in equilibrium with the polyhydric alcohol. In this method, a sample of the polyhydric alcohol is enclosed in an airtight tube held at a constant predetermined temperature and a commercial hygrometer is used to measure the relative humidity of the water vapor in the air above the sample when equilibrium has been reached — usually after a few hours. The hygrometer is calibrated to give readings of the % by weight of free water adsorbed into the polyhydric alcohol using a number of saturated solutions, each of which corresponds to a known relative humidity.

The required amount of adsorbed water may be introduced into the polyhydric alcohol by the following method:

1. A quantity of the polyhydric alcohol is dried thoroughly in a dessicator under vacuum over several changes of phosphorus pentoxide.
2. After drying, a known weight of the polyhydric alcohol is placed in a dessicator in the absence of air with the required weight of water and is left for two days to reach equilibrium.
3. The polyhydric alcohol is weighed on removal from the dessicator to check the absolute increase in the water content.

If it is necessary to store the polyhydric alcohol containing the desired amount of adsorbed water for any lengthy period, it is preferable to allow access to air for a short time before mixing the polyhydric alcohol with the oleaginous vehicle.

It will be understood by a person skilled in the art that the oleaginous vehicle should be non-toxic, non-volatile and chemically stable under the operating conditions. Furthermore, it is preferable that it should have a low freezing-point and a low bulk viscosity in the absence of an electric potential. It is also preferable that the oleaginous vehicle should have a high molar volume (where molar volume is defined to be molecular weight divided by density) — e.g., alginic acid is used as polyhydric alcohol, the molar volume is preferably greater than 110.

In a preferred embodiment of a fluid composition according to the invention, the oleaginous vehicle has a density which is equal to the density of the combination of the polyhydric alcohol and the adsorbed water in order that settling out of the polyhydric alcohol may be prevented during an extended period of operation. In order that an accurate density match may be achieved, it has been found expedient to measure the density of the polyhydric alcohol when it is suspended in the oleaginous vehicle to allow for any possible swelling of the polyhydric alcohol therein. An accurate density match is most conveniently achieved by using a mixed oleaginous vehicle which is an admixture of a plurality of oleaginous vehicles and adjusting the concentrations of the said plurality of oleaginous vehicles in the admixture to yield a density of the admixture equal to the required value. An accurate density match may conveniently be detected when equal amounts of the polyhydric alcohol rise and sink in the oleaginous vehicle on centrifugation. Preferably the mixed oleaginous vehicle is an admixture of two oleaginous vehicles, one having a density greater than the density of the polyhydric alcohol and the other having a density lower than the density of the polyhydric alcohol. It should be noted that density matching will only be exact at one temperature because of the difference in the coefficients of expansion of the oleaginous vehicle and the polyhydric alcohol and it may therefore be preferable to density match at the required temperature of operation.

Examples of oleaginous vehicles which are particularly suitable for working the invention include Fluorolube FS-5 (Registered Trade Mark) — a polymer of trifluorovinyl chloride marketed by the Hooker Chemical Corporation of New York; Aroclor 1242 (Registered Trade Mark) — a polychlorinated biphenyl fraction marketed by the Monsanto Chemical Corporation; and ortho-dichlorobenzene, but it should be understood that the invention is in no way limited to the inclusion of one of these vehicles. Other oleaginous vehicles which have been found useful in the preparation of fluid compositions of the type herein described include xylene and p-chlorotoluene. In the preferred embodiment of the invention wherein a mixed oleaginous vehicle which is an admixture of two oleaginous vehicles is used to obtain an accurate density match with the polymer, it has been found particularly suitable to use Fluorolube FS-5, which as a density of 1.87 and a viscosity of 11 centipoise at room temperature, — as the more dense component and either Aroclor 1242 — density 1.38— or orthodichlorobenzene — density 1.30 — as the lower density component. A suitable admixture of Fluorolube and Aroclor would be expected to give a fluid composition of viscosity of about 22 centipoise at 30° C. In such a preferred embodiment, dichlorobenzene is to be preferred to "Aroclor 1242" as it is considerably less viscous in the absence of an electric potential and is less of an environmental hazard. Dichlorobenzene does however suffer from the disadvantage that, when included in a fluid composition according to the invention, it passes approximately twice as large an electric current as "Aroclor 1242". Other combinations of fluorinated hydrocarbons with other chlorinated materials or with plain hydrocarbons may provide equally effective mixed oleaginous vehicles.

If necessary, a fluid composition according to the invention may include a fluidizer to render it fluid or alternatively, thixotropic. Suitable fluidizers include sorbitan mono-oleate or sorbitan sesquioleate.

There are set out below a number of examples of fluid compositions according to the invention. These are exemplary only and are offered to provide those skilled in the art with further information as to the scope of the invention. Furthermore it should be noted that the figures of composition which are provided for each example represent only a guide to the optimum fluid composition which may be obtained since, as specifically explained hereinbefore, the said optimum fluid composition must be arrived at finally by experiment and must be related to that particular application for which it is intended.

In the examples set out below, the oleaginous vehicle is assumed to be an admixture of Aroclor 1242 and Fluorolube and the percentages by weight of Aroclor 1242 and Fluorolube are those which will give an oleaginous vehicle which is density-matched to the polymer. If dichlorobenzene is to be substituted for Aroclor 1242, the percentages of Fluorolube in the admixture should be increased slightly. Since the polyhydric alcohol and the oleaginous vehicle have the same densities, the percentages of the polyhydric alcohol and the oleaginous vehicle as included in the fluid compositions can refer either to weight or to volume.

| Example No 1 | Percentage |
|---|---|
| Polyhydric alcohol - alginic acid (Density 1.64) <br> Water - 8.7% by weight of polyhydric alcohol | 30–35 |
| Oleaginous vehicle - (60% Fluorolube) <br> (40% Aroclor) | 70–65 |
| | 100 |

This fluid is suitable for most applications.

| Example No 2 | Percent |
|---|---|
| Polyhydric alcohol - Sodium Carboxy methyl Sephadex (Density 1.55) <br> Water - 9.0% by weight of polyhydric alcohol | 30–35 |
| Oleaginous vehicle (40.5% Fluorolube) <br> (59.5% Aroclar) | 70–65 |
| | 100 |

This fluid has a low mechanical response and passes a relatively low electric current. It has a lower bulk viscosity at room temperature than the fluid of example No. 1.

| Example No 3 | Percent |
|---|---|
| Polyhydric alcohol - Carboxy methyl Sephadex [Free Acid] (Density 1.8) <br> Water - 8.7% by weight of polyhydric alcohol | 30–35 |
| Oleaginous vehicle - (86% Fluorolube) <br> (14% Aroclor) | 70–65 |
| | 100 |

This fluid has a mechanical response similar to that of the fluid of example No. 1 but it possesses a considerably reduced bulk viscosity at room temperature.

| Example No 4 | Percent |
|---|---|
| Polyhydric alcohol - Sulphopropyl Sephadex [Free Acid] (Density 1.75) <br> Water - 5.5% by weight of polyhydric alcohol | 30–35 |
| Oleaginous vehicle - (77% Fluorolube) <br> (23% Aroclor) | 70–65 |
| | 100 |

This fluid possesses a relatively low amount of adsorbed water and therefore may be particularly useful for high temperature applications.

Figure 2:
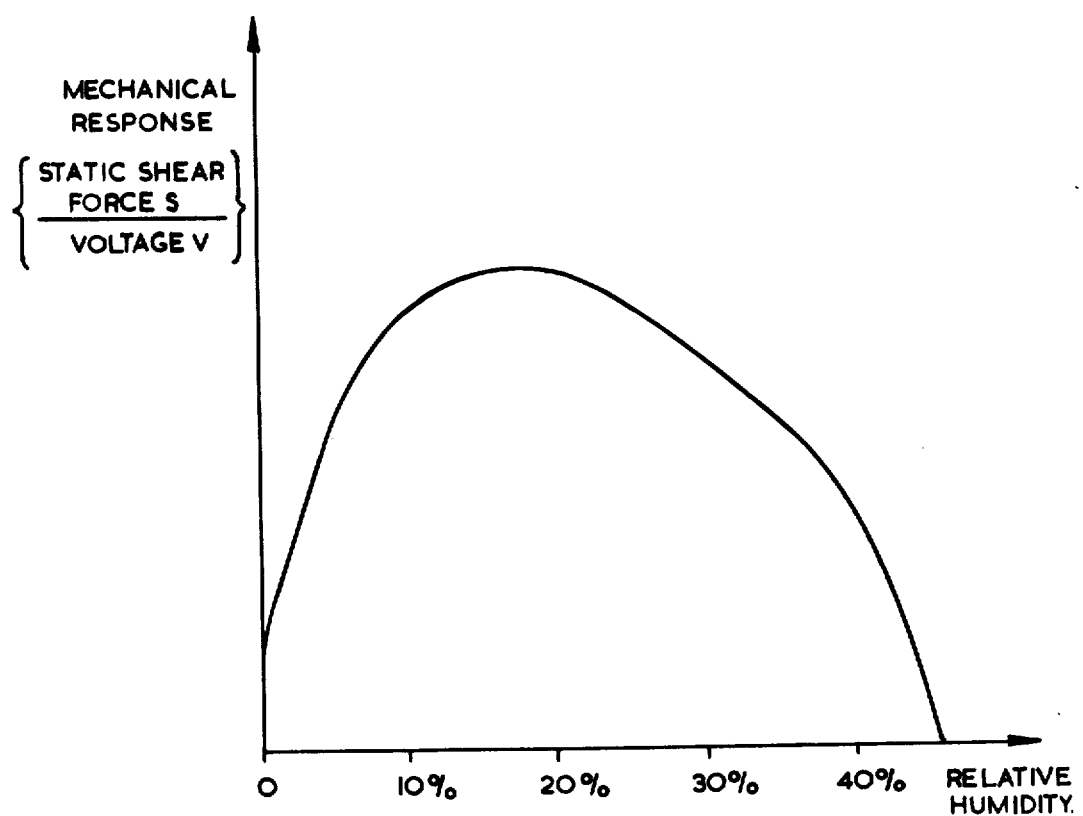
Figure 3:
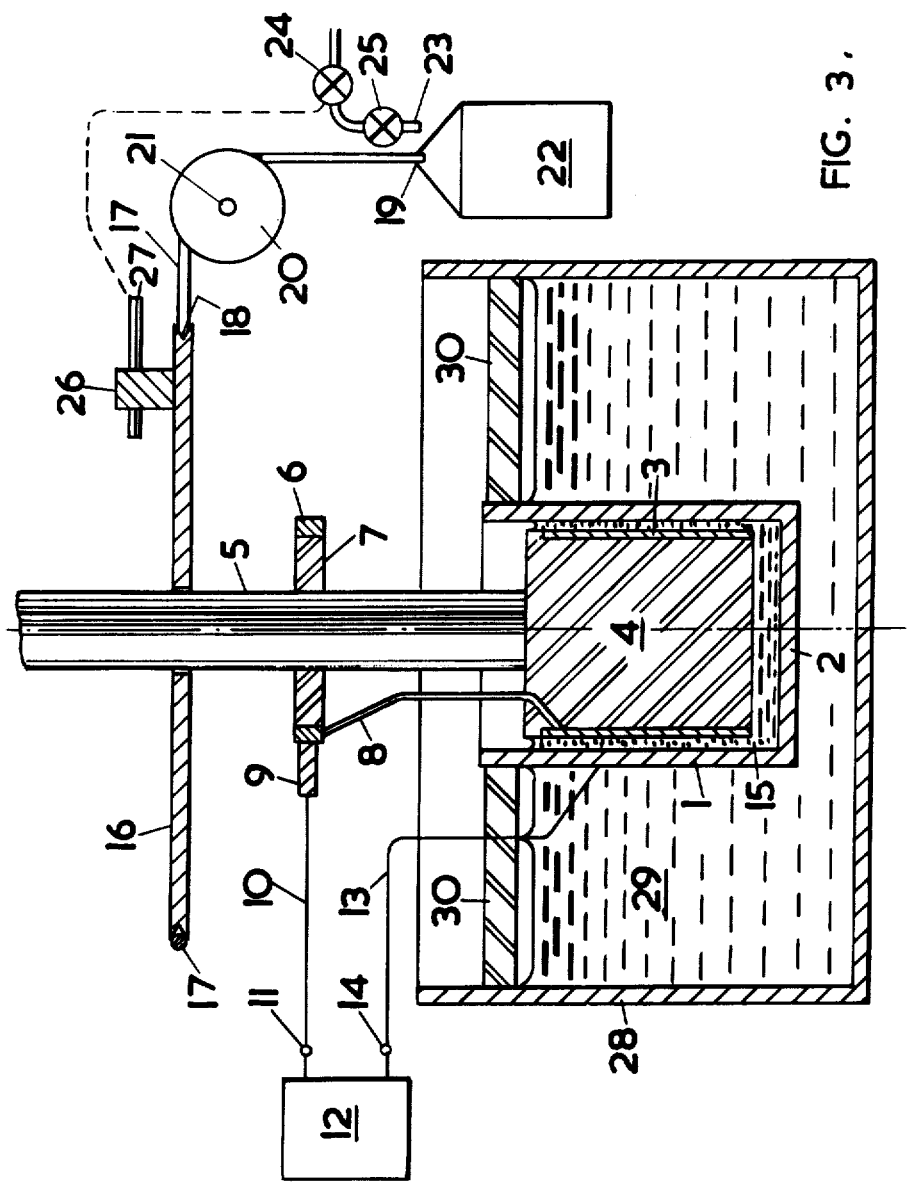

The invention will be further described, by way of example only, with reference to the accompanying drawings in which FIG. 1 is a graph of the mechanical response versus the molar volume of oleaginous vehicle for a selection of fluid compositions according to the invention, FIG. 2 is a graph of the mechanical response of a fluid composition according to the invention versus the relative humidity of the polyhydric alcohol of the fluid composition, and FIG. 3 illustrates a vertical cross-section of a concentric cylinder rig used for conducting static tests on fluid compositions according to the invention.

Some pertinent properties of a number of oleaginous vehicles are listed in the following table. The measurements of mechanical response are expressed as the static shear force divided by the applied voltage and they are plotted against molar volume in FIG. 1.

| Oleaginous vehicle | Mechanical response | Boiling pt °C | Density | Mol. Wt. | Molar volume |
|---|---|---|---|---|---|
| Aroclor | 1262 ± 128 | 200 | 1.38 | | ≈300 |
| Toluene | 959 ± 188 | 111 | 0.87 | 92 | 105.7 |
| Xylene | 1162 ± 415 | 138 | 0.86 | 106 | 123.3 |
| Carbon tetrachloride | 544 ± 54 | 77 | 1.56 | 154 | 98.7 |
| Chloroform | 500 ± 368 | 61 | 1.48 | 119 | 80.4 |
| Nitrobenzene | No effect - possibly due to high dielectric content | | | | |
| Chlorobenzene | 655 ± 87 | 132 | 1.11 | 112.5 | 101.3 |
| Ortho-dichlorobenzene | 1031 ± 258 | 179 | 1.30 | 147 | 113.1 |
| p-chlorotoluene | 1181 ± 181 | 160 | 1.07 | 127 | 118.7 |
| Cyclohexane | 1035 ± 133 | 81 | 0.78 | 84 | 107.7 |
| Bromobenzene | 498 ± 79 | 156 | 1.5 | 159 | 104.7 |

It is seen from the table that both ortho-dichlorobenzene and p-chlorotoluene show mechanical responses comparable with the of Aroclor. Both ortho-dichlorobenzene and p-chlorotoluene have low viscosities at room temperature (about 4 centipoise), compared with Aroclor, and they may therefore be used in admixture with Fluorolube to provide compound oleaginous vehicles suitable for low temperature operation.

Referring to FIG. 2, which is a graph of the static mechanical response of a fluid composition comprising alginic acid as polyhydric alcohol and Aroclor 1242 as oleaginous vehicle versus the relative humidity of the alginic acid as determined by the method hereinbefore described, the importance of ensuring that no more adsorbed water is introduced into the fluid composition than is absolutely necessary is underlined by the rapid decrease in the mechanical response with the increase of the relative humidity beyond the optimum value of ≈20%. The alginic acid particles used had a pseudo- Gaussian distribution of diameters having a maximum at 7.3 μm and a half-width of 9 μm.

Referring to FIG. 3, a simple rig for conducting static tests on a fluid composition according to the invention has a first cylindrical conductor 1, 5.1 cms in diameter, blanked off at its lower end 2 to form a fluid container, and a second cylindrical conductor 3, 5 cms long and 5 cms in diameter, mounted on a solid insulating cylinder 4 so as to be concentric with the first conductor 1. The insulating cylinder 4 is rigidly and coaxially attached at its upper end to a cylindrical rod 5 which is mounted in bearings (not shown) so as to rotate freely about its vertical axis. An annular slip-ring 6, which is mounted on an insulator 7 attached to the rod 5, is electrically connected to the second conductor 3 by a first wire 8. A carbon brush 9 is mounted (by means not shown) to bear on the slip-ring 6 and is electrically connected by a second wire 10 to one terminal 11 of a 0–5 kV power supply 12. The first conductor 1 is electrically connected by a third wire 13 to the second terminal 14 of the power supply 12. A fluid composition 15 according to the invention fills the annular volume between the conductors 1 and 3.

A first pulley wheel 16, approximately 15 cms in diameter, is rigidly attached to the rod 5 and has a light cord 17 running in a circumferential groove 18. One end 19 of the cord 17 passes over a second pulley wheel 20, which is free to rotate about an axle 21, and is attached to an open-topped vessel 22. The vessel 22 can be filled with water from a pipe 23 which is connected to a water supply (not shown) and which is controlled by a series combination of an electrically operated stop-cock 24 and a manually operated tap 25. A small known tension T is applied to the second end (not shown) of the cord 17. In the absence of any water in the vessel 22, the tension T maintains the first pulley wheel 16 in a rotational position with a pin 26 attached to the upper surface of the first pulley wheel 16 exerting pressure on a micro-switch 27 which is used to provide control for the stop-cock 24. It is arranged that the stop-cock 24 is open when the pin 26 is exerting pressure on the micro-switch 27 and that the stop-cock 24 closes as soon as this pressure is removed.

The first conductor 1 is suspended in a thermostatically controlled bath 28 of liquid 29 maintained at a constant predetermined temperature (by means not shown) and lagging material 30 reduces temperature changes caused by convection to a minimum.

In operation, initially the vessel 22 is empty, the stop-cock 24 is maintained in an open state by the pressure exerted on the micro-switch 27 by the pin 26, and the tap 25 is closed. The power supply 12 is adjusted to apply the required test voltage V across the annular volume between the conductors 1 and 3 and the tap 27 is opened. Water flows from the pipe 23 into the vessel 22 until a time is reached when the moment about the axis of the second conductor 3 of the combined force which the vessel 22 and the water which it contains exerts on the cord 17 is equal to the sum of the moments of the shear force S of the fluid composition 15 and the tension T about the axis of the second conductor 3. At this point, the pressure which the pin 26 exerts on the micro-switch 27 is zero and the stop-cock 24 closes. The vessel 22 together with the water which it contains is weighed and the shear force S of the fluid composition 15 is calculated. The experiment is repeated for a range of different voltages V and a graph of S against V enables the mechanical response of the fluid composition 15 to be determined.

I claim:
1. An electroviscous fluid which comprises at least one polyhydric alcohol in solid particulate form which polyhydric alcohol contains acid groups selected from the group consisting of carboxylic acid groups and sulphonic acid groups and has a structure in which water is adsorbed, and an electrically non-conducting oleaginous vehicle in which the solid particles are dispersed.
2. A composition according to claim 1 wherein the polyhydric alcohol is at least substantially insoluble both in water and in the oleaginous vehicle.
3. a composition according to claim 1 wherein the polyhydric alcohol is a polymer of a monosaccharide.
4. A composition according to claim 3 wherein the polymer of a monosaccharide is alginic acid.
5. A composition according to claim 4 wherein the oleaginous vehicle has a molar volume greater than 110.
6. A composition according to claim 3 wherein the polymer of a monosaccharide is a carboxymethyl Sephadex (Registered Trade Mark).
7. A composition according to claim 3 wherein the polymer of a monosaccharide is a sulphopropyl Sephadex (Registered Trade Mark).
8. A composition according to claim 1 wherein the polyhydric alcohol is a co-polymer of a plurality of monosaccharides.
9. A composition according to claim 1 wherein the polyhydric alcohol is present in the form of a salt.
10. A composition according to claim 9 wherein the salt is a sodium carboxymethyl Sephadex (Registered Trade Mark).
11. A composition according to claim 1 wherein the polyhydric alcohol is greater than 25% and less than 40% of the composition, by volume.
12. A composition according to claim 11 wherein the volume fraction of the polyhydric alcohol is greater than 30% and less than 35%.
13. A composition according to claim 1 wherein the solid particles of the polyhydric alcohol have diameters which are greater than 1μm and less than 50μm.
14. A composition according to claim 13 wherein the solid particles have diameters which are greater than 4μm and less than 20μm.
15. A composition according to claim 1 wherein the amount of adsorbed water is a function of the acid strength of the polyhydric alcohol, the amount of adsorbed water increasing with a decreasing acid strength.
16. A composition according to claim 15 wherein the amount of adsorbed water is between 4% and 12% by weight of the amount of polyhydric alcohol.
17. A composition according to claim 1 wherein the oleaginous vehicle has a molar volume greater than 80.
18. A composition according to claim 1 wherein the oleaginous vehicle is density matched to the polyhydric alcohol in which the water is adsorbed.
19. A composition according to claim 1 wherein the oleaginous vehicle is an admixture of at least two compounds, one compound having a density greater than the density of the polyhydric alcohol and the other compound having a density lower than the density of the polyhydric alcohol.
20. A fluid according to claim 1 including a fluidizer which comprises sorbitan nono-oleate.
21. A fluid according to claim 1 including a fluidizer which comprises sorbitan sesquioleate.

* * * * *